(12) United States Patent
McGloin et al.

(10) Patent No.: US 6,694,374 B1
(45) Date of Patent: Feb. 17, 2004

(54) INTEGRATION OF DATA PROCESSING SYSTEMS

(75) Inventors: Cathal McGloin, Dublin (IE); Raymond McGloin, Dublin (IE)

(73) Assignee: Performix Research Limited, Dublin (IE)

( * ) Notice: Subject to any disclaimer, the term of this patent is extended or adjusted under 35 U.S.C. 154(b) by 648 days.

(21) Appl. No.: 09/672,828

(22) Filed: Sep. 29, 2000

Related U.S. Application Data

(63) Continuation-in-part of application No. PCT/IE00/00074, filed on Jun. 8, 2000.

(30) Foreign Application Priority Data

Aug. 3, 1999 (IE) .................................................. 990665

(51) Int. Cl.[7] ........................................... G06F 13/100
(52) U.S. Cl. ..................................................... 709/238
(58) Field of Search ................................. 709/200, 217, 709/218, 219, 238, 242, 244, 246

(56) References Cited

U.S. PATENT DOCUMENTS 5,560,005 A  9/1996 Hoover et al. ............... 395/600
5,806,066 A  9/1998 Golshani et al. ............ 707/100

FOREIGN PATENT DOCUMENTS

WO   WO00/13112   3/2000

*Primary Examiner*—Robert B. Harrell
(74) *Attorney, Agent, or Firm*—Jacobson Holman PLLC

(57) ABSTRACT

A host system such as a performance management system 1 uses an integration engine (18) to automatically capture data from external systems such as a switch. The engine (18) allows the user to configure it for population of columns in a data container according to simple or advanced filtering mappings. Data is further consolidated according to agents in containers associated with the external systems. Data dictionary rules define how fields for information management function (6) are generated.

23 Claims, 11 Drawing Sheets

| Hierarchy | Product Authorisation | | |
|---|---|---|---|
| Level | Icon | Description | |
| 1 | | Agent | |
| 2 | | Team Leader | |
| 3 | | Manager | |
| 4 | | Senior Manager | |
| 5 | | Function | |
| 6 | | Site Address | |
| 7 | | Organisation | |

Selection Icon | Add | Remove

OK | Cancel | Help

Hierarchy Maintenance

Fig. 3(a)

| Product | Agent | Team Leader | Manager | enior Manag | Function | Sit |
|---|---|---|---|---|---|---|
| APPRAISAL M | ✓ | ✓ | ✓ | ✓ | ✓ | |
| PERSONAL DE | ✓ | ✓ | ✓ | ✓ | ✓ | |
| MANUAL ENTA | ✓ | ✓ | ✓ | ✓ | ✓ | |
| REWARD + REI | ✓ | ✓ | ✓ | ✓ | ✓ | |
| KEY PERF INDI | | ✓ | ✓ | ✓ | ✓ | |
| REPORT MAN | | | | | | |

Fig. 3(b)

```
┌──────────────────────────────────────────────────┐
│ □  Data Dictionary Configuration         ? │ X │
│ ┌──────────────────────────────────────────────┐ │
│ │ General │ Formula │ Rules │                  │ │
│ │ ┌──────────────────────────────────────────┐ │ │
│ │ │ Field       │ Description            │ ▲ │ │ │
│ │ │ FGN_VALUE1  │ Avg Handling Time      │   │ │ │
│ │ │ FGN_VALUE2  │ Talk Time              │   │ │ │
│ │ │ FGN_VALUE3  │ Wrap Time              │ ▼ │ │ │
│ │ └──────────────────────────────────────────┘ │ │
│ │  Value 1            Operator    Value 2      │ │
│ │ ┌──────────────┬▲┐  ┌────┬▲┐  ┌───────────┬▲┐│ │
│ │ │sum[fgn_value5]│ │ │ /  │ │  │sum[fgn_value21]││ │
│ │ └──────────────┴▼┘  └────┴▼┘  └───────────┴▼┘│ │
│ │  ┌─Test Data────────────────────────────────┐│ │
│ │  │ Result  [                 ]   [ Test ]   ││ │
│ │  └──────────────────────────────────────────┘│ │
│ │                  [ OK ]  [ Cancel ]  [ Help ]│ │
│ └──────────────────────────────────────────────┘ │
└──────────────────────────────────────────────────┘
                      Fig. 4(b)
```

```
┌──────────────────────────────────────────────────┐
│ □  Data Dictionary Configuration         ? │ X │
│ ┌──────────────────────────────────────────────┐ │
│ │ General │ Formula │ Rules │                  │ │
│ │                                              │ │
│ │  Min Value: [ 0 ]     Max Value: [ 10000 ]   │ │
│ │  Display Mask  [ ##% ]                       │ │
│ │                                              │ │
│ │  □ KPI Entry                                 │ │
│ │  □ Manual Data Entry                         │ │
│ │  ☑ Override                                  │ │
│ │                                              │ │
│ │                  [ OK ]  [ Cancel ]  [ Help ]│ │
│ └──────────────────────────────────────────────┘ │
└──────────────────────────────────────────────────┘
                      Fig. 4(c)
```

INTEGRATION OF DATA PROCESSING SYSTEMS

This is a Continuation-in-Part of PCT International Application No. PCT/IE00/00074, filed Jun. 8, 2000.

FIELD OF THE INVENTION

The invention relates to integration of data processing system to allow effective and automatic data transfer. An example is a performance management system capturing data from a switch, a work force manager, and other external systems.

1. Prior Art Discussion

Various mechanisms are known for transfer of data, such as flat (ASCII) file transfer and use of APIs. However, they do not provide for very comprehensive transfer of data in a versatile and automated manner to the extent that the systems are effectively integrated.

2. Objects of the Invention

An object of the invention is to provide an integration engine which performs data transfer in a manner which is sufficiently comprehensive and "intelligent" to effectively integrate at least two data processing systems.

SUMMARY OF THE INVENTION

According to the invention there is provided an integration engine for transfer of source data from a data processing external system to a data processing host system, the integration engine comprising:
 a configuration function comprising means for defining the external system data to be exported, mappings to be applied to the exported data, and target locations in the host system for imported data, and
 an execution function comprising means for translating the mappings into executable program code, and for executing the code to import data into the host system.

In one embodiment, the configuration function comprises means for generating an external system dataset, mappings dataset, and a parameter value dataset.

In one embodiment, the configuration function comprises means for definition of target locations in the host system as data container columns.

In one embodiment, the configuration function comprises means for defining mathematical function mappings in which source data from a plurality of locations in the external system is processed.

In one embodiment, the execution function comprises means for consolidating the imported data according to persons for whom there are records in the host system.

In one embodiment, the execution function comprises means for writing the consolidated data to a plurality of data containers of which there is at least one per external system.

In one embodiment, data associated with each person is written to a single dataset in each container.

In one embodiment, the execution function comprises means for merging selected data from said containers into a single foreign data container comprising a single dataset per person.

In one embodiment, the execution function comprises means for generating interfacing with an information management function of the host system to generate output results.

In one embodiment, the configuration function comprises means for defining filtering of the source data.

In one embodiment, the configuration function comprises means for storing mapping operator statement for mapping of data from an external system to a data container.

In one embodiment, the configuration function comprises means for associating the statements 11 with parameter fields, having variable values.

In one embodiment, the host system is a performance management system and the external system is a customer services system.

According to another aspect, the invention provides a host system comprising:
 an integration engine as claimed in any preceding claim,
 information management functions for processing the imported data.

In one embodiment, the host system is a performance management system further comprising:
 a call centre configuration function for configuring call centre parameters in a configuration dataset, and
 a data dictionary function for formulating under user instructions, calculation rules, value inputs for rules, and storage parameters for database fields.

In one embodiment, the user interface, the configuration functions, and the performance management functions together have a structure of classes for instantiating objects in a user interface layer, a business logic layer, and a data services layer.

In one embodiment, the business logic class instantiates business logic objects having code of a configuration or an information function, and means for terminating the object at the end of a user session.

In one embodiment, the business logic layer executes on a business server.

In one embodiment, the data services layer comprises a class for instantiating data services objects residing on a database server and means for terminating said objects after a user session.

In one embodiment, the system comprises a transaction server for executing data services layer functions.

In one embodiment, the transaction server comprises means for maintaining a pool of data services objects together and for maintaining a pool of database connections.

In one embodiment, dynamic library links for the objects are registered using proxy stub pairs on both a client and a server.

In one embodiment, the integration engine comprises means for writing imported data to a foreign data table after execution of mappings and selection of particular fields, and in which the data is consolidated into one dataset per agent, and the information management functions comprises means for generating performance management results according to data definitions generated by the data dictionary function.

BRIEF DESCRIPTION OF THE DRAWINGS

The invention will be more clearly understood from the following description of some embodiments thereof, given by way of example only with reference to the accompanying drawings in which:

FIGS. 3(a), 3(b), 4(a), 4(b), and 4(c) are sample screen shots illustrating operation of a data dictionary maintenance function;

DESCRIPTION OF THE EMBODIMENTS

Figure 1:
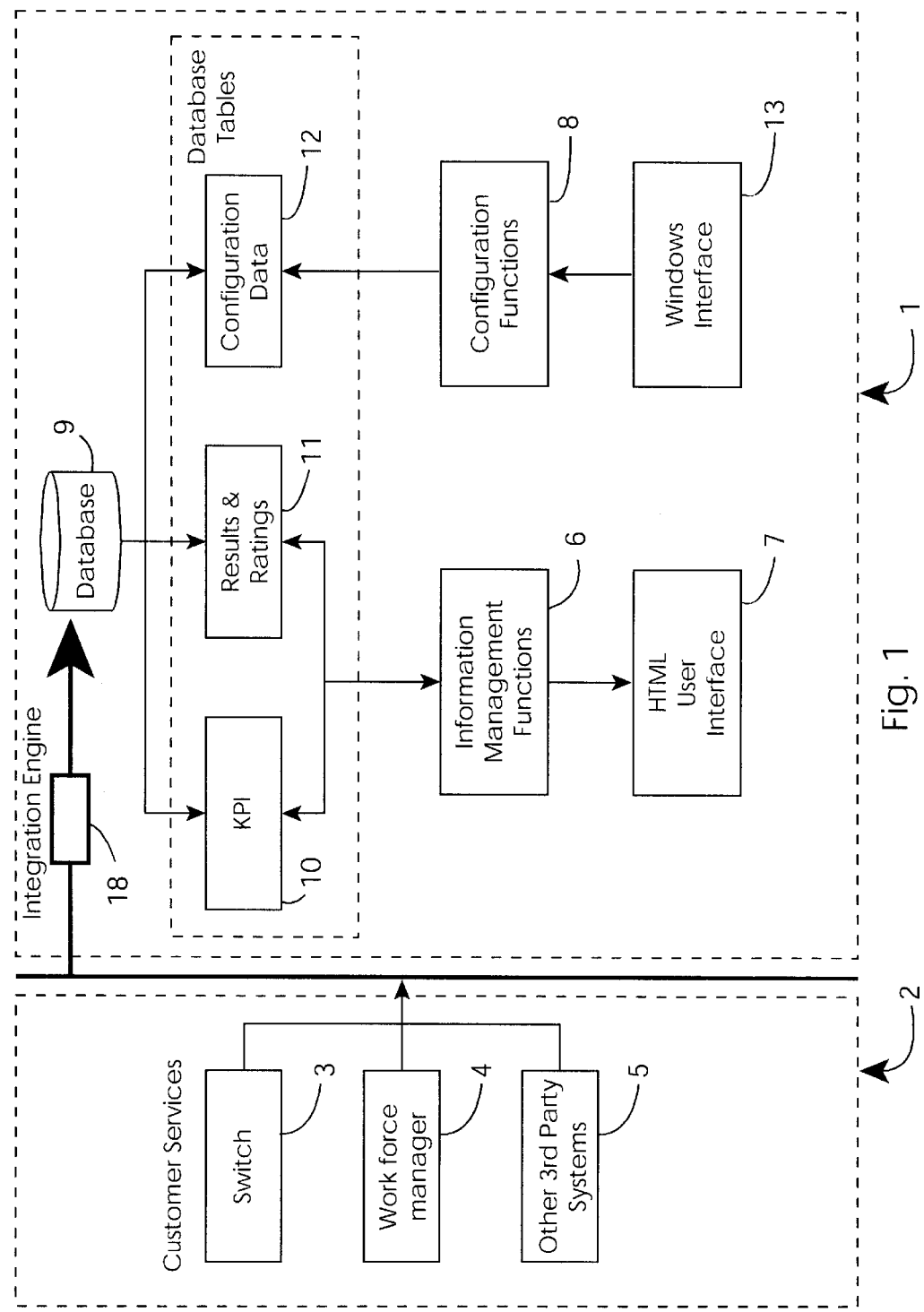
FIG. 1 is an overview block diagram of a performance management system.

Referring to FIG. 1 there is shown a performance management system 1 for the management of performance in a customer services environment and reporting on same. The system 1 interfaces with external performance measurement systems 2 comprising a switch 3, a work force manager 4, and third party systems 5 that store performance measurement data within a structured database and can produce reports on either employee, application, departmental or organisational performance.

The system 1 comprises information management functions 6 which use data from a KPI (key performance indicator) table 10 and a results & ratings table 11 within a database 9 to perform calculations pertaining to individual performance of employees, in addition to the overall performance within the customer services centre. The information management functions 6 interact with an HTML user interface 7 to display to the end-user the results of the calculations performed on performance. The database 9 also contains configuration data tables 12. The contents of these tables allow the system 1 to be tailored to suit individual organisations, thus minimising the need for bespoke development of the system to suit particular business operations. The configuration data is captured through use of configuration functions 8, and a Windows™-based interface 13, which provides the user with a GUI to specify the unique characteristics of the organisation.

At a high level, the database 9 captures raw data from the external systems 2 in a comprehensive and automated manner using an integration engine 18. The performance data is provided in real time via the HTML user interface 7 in response to appropriate requests/enquiries. The performance data may relate to individual customer service agents, to teams, or to overall departments and even site locations. Performance is measured against objectives set up during configuration, and also against KPIs. Like objectives, KPIs have targets but are not rated. However they do not relate to persons, but instead to an organisation or department as a whole.

Figure 2:
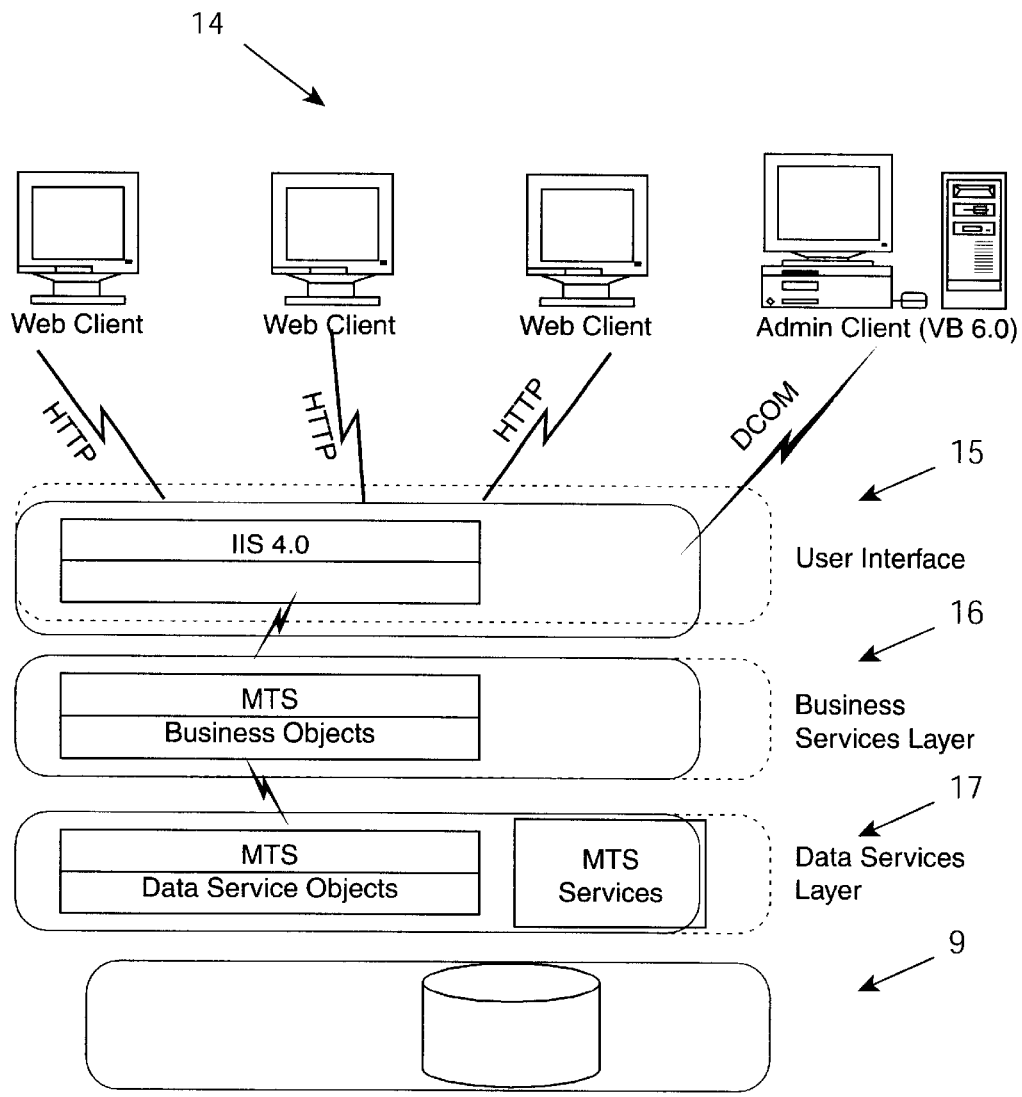
FIG. 2 is a diagram illustrating the physical architecture of the performance management system.

The architecture of the system 1 is shown in FIG. 2 It has a three-tier architecture, which consists of a user interface layer 15 supporting the interfaces 7 and 13, a business services layer 16 supporting the functions 6 and 8, and a data services layer 17 supporting the database 9 and the integration engine 18. The functions are instantiated as objects from user interface, business logic, and data services classes. Objects are instantiated for a task such as a user enquiry session and are terminated at the end.

User Interface Layer 15

There are two types of user interface as follows.

The Browser Interface 7

This consists of a set of Web classes that reside on a Web server. Objects instantiated from these classes send HTML to a client browser. The primary role of the browser 7 is to view the data in a variety of ways i.e. graphically, tabular, by day, by month, by year. The browser front-end allows the measurement and management of performance. The measurement is by viewing the data in a variety of forms, and the management is by allowing the user to specify (according to his security privileges) targets, development plans, comments and even override results. The Web server interfaces with user Web clients 14.

The Interface 13

This consists of a set of forms which reside in the user interface layer 15. It sends the configuration data directly to the business services layer. The primary role of the interface 13 is to configure the browser 7 and to determine the behaviour of the data within the system 1. The Windows interface allows 'tailoring' of the system to meet the specific requirements and characteristics of the contact management centre, thus omitting the need for expensive customisation of the product.

Business Services Layer 16

This layer comprises a business server on which resides the functions 6 and 8. These functions perform all calculations and all validations. The interface 13 directly accesses the business server whilst the interface 7 accesses the business server via the Web server.

Data Services Layer 17

The data services layer 17 comprises a data server hosting the database 9. This layers performs data integration with the external systems.

A data server hosts data services objects in addition to the actual database 9. The business server calls the data services object, which then in turn retrieve data from the database 9.

The system 1 also comprises a transaction server. This handles all of the database transactions between the objects in the business layer and the objects in the data services layer. It holds a pool of objects together, maintains a pool of database connections, and allows improved scalability and performance.

Dynamic Library Links (DLLs) are registered using proxy stub pairs on both the servers and on the clients. When a function 6 requires the DLL, the proxy stub pairs direct the function to the DLL stored on the server. The proxy stub pairs therefore enable the objects to communicate with each other across multiple servers.

The configuration functions 8 include a call centre configuration function, a hierarchy maintenance function, and a data dictionary maintenance function.

The information management functions 6 handle aspects such as personal development, setting objectives for agents, and processing agent awards.

The integration engine 18 together with the data dictionary function provide comprehensive data for the information management functions 6.

The call centre configuration function is used via the Windows™ interface to construct the conceptual organisational hierarchy. The organisation can configure up to ten hierarchical levels. FIG. 3(a) shows an example for an organisation that has seven levels from agent through to the global organisation view. The screen of FIG. 3(b) then allows the user to determine functional access (at the browser end) to the various performance management functions for each level as specified in the system hierarchy in FIG. 3(a). This is inputted in a simple Yes/No cellular structure. Because the defined organisational hierarchy forms a basis for the operation of many other functions, amendments to the same can only be made by a senior systems administrator with the appropriate access and user rights.

The call centre configuration function is coded in Visual Basic™ and refers to the characteristics of the customer services centre.

After the call centre configuration has been defined a hierarchy configuration is then set up for each site using the hierarchy maintenance function. The fields completed for site configuration are call centre name, call centre ID, year and week start values, system days, close off data, currency mask and a moratorium value.

Figure 4A:
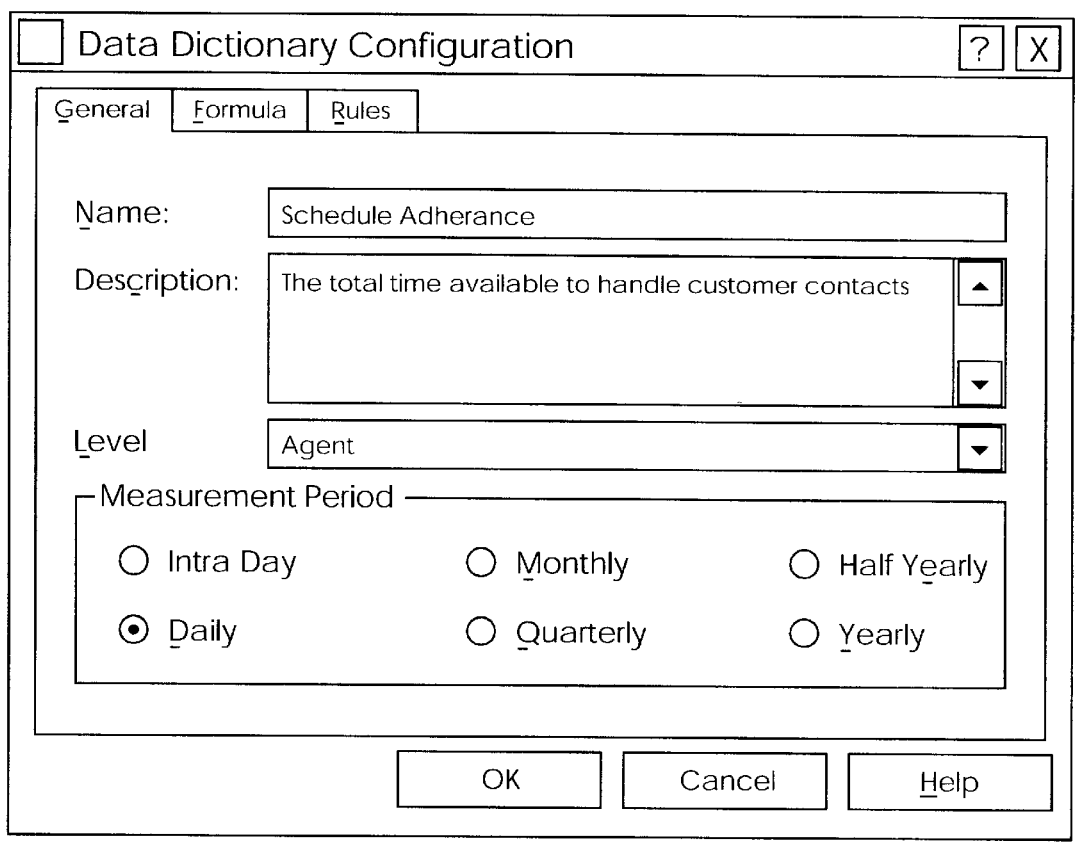

The data dictionary maintenance function allows users to manipulate the measurement data that has been imported from the third party performance measurement systems. The primary purpose is to formulate the performance management system objective fields from all the data fields imported from the external third party databases or performance measurement systems. A sample screen is shown in FIG. 4(a), in which the user is creating a new data dictionary field that forms the measurement of schedule adherence (the percentage of time an agent actually spends signed-on to their phone against the time they were scheduled to be there). As illustrated, the user inputs a name description, associates the data dictionary field to a level in the hierarchy, and specifies the period against which the measurement data is captured. The level must be chosen from the set established when creating the organisation hierarchy. A second screen, shown in FIG. 4(b), is used to assign the data dictionary name to a database field or a combination of database fields and defining how these fields are to be calculated. The calculation is defined by a Value 1/Operator/Value 2 sequence. In the example FIG. 4(b), the user selects the field [fgn_value5] which relates to the actual time the agent was signed-in (taken from the ACD) and divides this by [fgn_value21] which relates to the amount of time they had been scheduled to be signed-in (taken from the Workforce Management System).

The following table sets out the field descriptions in more detail.

| Field Name | Mandatory/ Optional | Field Behaviour | Field Description |
|---|---|---|---|
| Field | — | Displayed | This column displays the database fields that may be entered. |
| Description | — | Displayed | This column displays the description associated with the field. This cannot be edited by the user within the DDM 22 as it is display only. It is stored within the DDM. |
| Value1 | M | Input | This fields allows the user to enter the summation formula for the summary periods. A result will be produced for all periods regardless of whether the period was chosen as a rating period in the objective wizard function. Supported<br><br>All approved ANSI 92 SQL Statements The result of this part of the formula will be stored in the database and used to sum results for period and teams |
| Operator | O Mandatory if Value2 is entered | Selection | This operator makes up the complete formula using Value1 and Value2. Initially the data from the foreign data table is calculated using the full formula. To calculate the sum for periods and teams, the formula Value1 Operator Value2 will be used. Available operators<br><br>+;−;/;* |
| Value2 | O | Input | This fields allows the user enter the second part of the summation formula. This field may not be required for similar formulae of a field assignment. Supported<br><br>All approved ANSI 92 SQL Statements |

| Field Name | Mandatory/ Optional | Field Behaviour | Field Description |
|---|---|---|---|
| Result | — | Display | The result of this part of the formula will be stored in the database and used to sum results for period and teams Displays the result of an expression based on skeleton data, when the 'TEST' option is selected. |

The following table sets out the command options.

| Command Name | Description |
|---|---|
| TEST | This allows the user to test the full formula entered. A result of the formula is displayed from skeleton test data in the database. |
| OK | Saves any changes/additions made by the user without prompting for confirmation of same; and quits component/application. |
| CANCEL | If change/additions made, prompts user to save same; otherwise quits component/application. |
| HELP | Opens Help file for component. |

FIG. 4(c) shows an input screen used to define the data dictionary rules. These rules define how the result for the field is entered, displayed, and calculated. As illustrated in FIG. 4(c) the minimum and maximum values are set, as is the display mask. In this case ##% means that the result will be displayed as a % and rounded up with no decimal places. The over-ride check box allows the organisation to control whether or not these results can be over-ridden by a user's manager. The following table describes the inputs in more detail.

| Field Name | Mandatory/ Optional | Field Behaviour | Field Description |
|---|---|---|---|
| Min Value | O | Input. | This field is used to restrict the input permitted for a manual data entry or a result override. The value entered must be greater than or equal to this value. |
| Max Value | O | Input. | This field is used to restrict the input permitted for a manual data entry or a result override. The value entered must be less than or equal to this value. |
| Display Mask | O | Input | Determines how the result for the data dictionary field will be displayed. Used to indicate currency, percentage, minutes or seconds. |
| KPI | O | Check | Indicates that this data dictionary field will be used in conjunction with key performance indicators KPI's and not objectives |
| Manual | O | Check | Indicates that this data dictionary field will require a manager to enter a result manually and that data will not be populated automatically from the switch. |
| Over-ride | O | Check | Indicates that results for this data dictionary field cannot be over-ridden in the team performance review screen. This field will be used where the formula for the data dictionary |

-continued

| Field Name | Mandatory/ Optional | Field Behaviour | Field Description |
|---|---|---|---|
| | | | is deemed too complicated to allow values to be changed. |

The following are the command options

| Command Name | Description |
|---|---|
| OK | Saves any changes/additions made by the user without prompting for confirmation of same; and quits component/application. |
| CANCEL | If change/additions made, prompts user to save same; otherwise quits component/application. |
| HELP | Opens Help file for component, if in WinHelp then the topic is generally (but not always) specific to the tab/component the user is currently using. |

The following are the business rules.

| | |
|---|---|
| Description | If the data dictionary created is to be used to provide data for the key performance indicators (KPI's), then it must be entered above the highest level specified. |
| Reason | Entering the data dictionary that is to be used in conjunction with a KPI at the highest level |
| Typical Scenario | A data dictionary is to be created for Average Handling Time (AHT), this will also be later used as a Key Performance Indicator. The level for the AHT would have be the level higher than the highest level specified in Hierarchy Maintenance, i.e.: if the highest level in Hierarchy Maintenance was 'Organisation' at Level 7, then the Data Dictionary for AHT must be specified at Level 8. |

The following are the best practices.

| | |
|---|---|
| Description | The display mask must be configured to reflect the maximum characters as specified in the 'Max Value' field, i.e. if the maximum value is 4 characters (1000) then the display mask must provide provision for 4 characters (###0) |
| Reason | The input mask must provide provision for all the characters entered into the data dictionary field |
| Typical Scenario | A manual entry data dictionary is set-up called 'revenue', which will have a maximum amount of £1,000,000. The call centre wish this to be displayed with commas separating every 3 characters, a '£' sign and to 2 decimal places, therefore the input mask is specified as '£#,###,##0.00 |

It will be appreciated that the information management functions 6 require a comprehensive range of import data to adequately perform the required processing with use of the data dictionary configuration. As stated above the imports are performed by the integration engine 18. The integration engine allows flexibility in the nature of valid source data systems.

The integration engine 18 comprises a configuration function. This generates an integration folder comprising external systems, mappings, and parameters sub-folders. These sub-folders effectively configure the integration engine 18.

Figure 5:
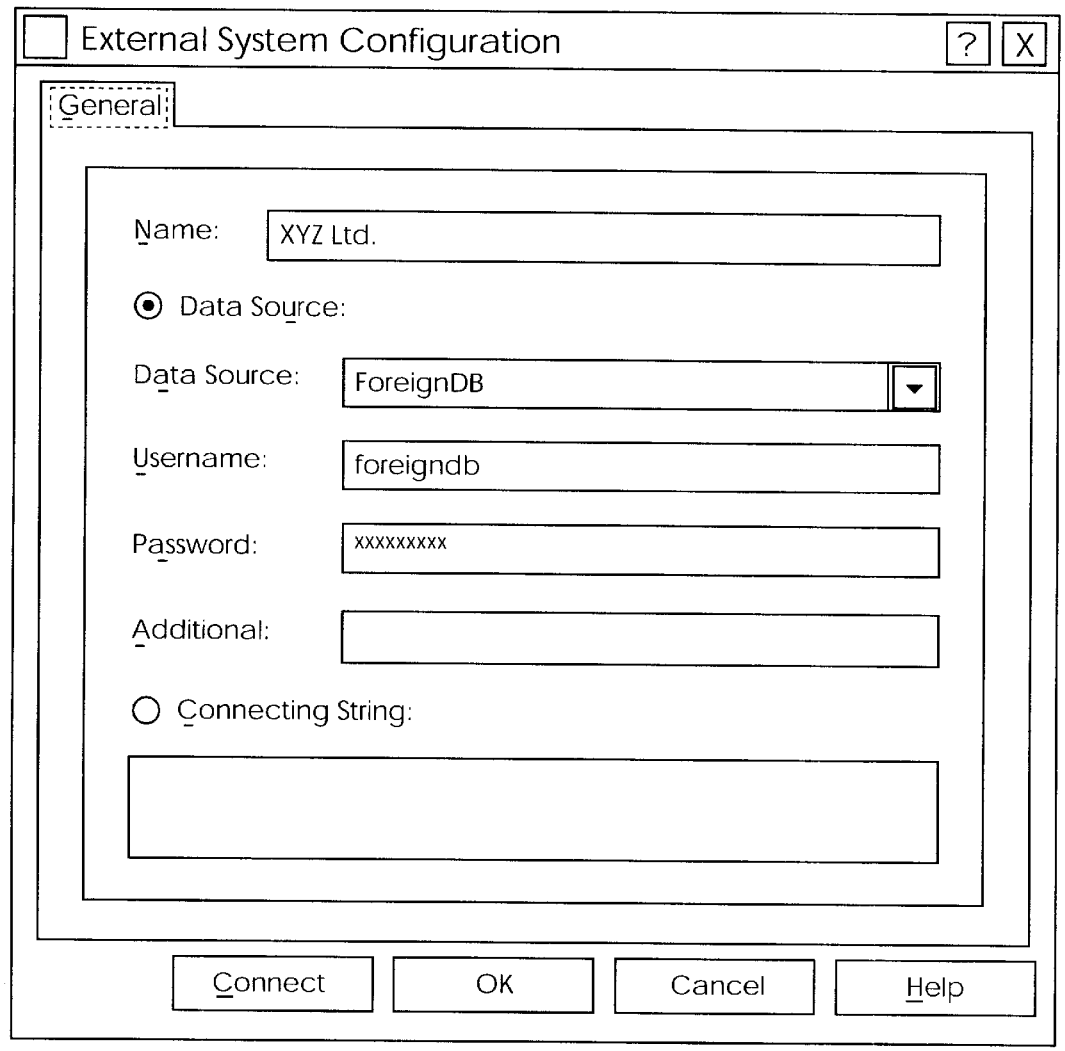
FIGS. 5 and 6 are sample screen shots illustrating operation of an integration engine.

The configuration function generates a display as shown in FIG. 5 for selection of the external system ODBC data source and to input the username, password, and additional parameters. This registers the external system.

Figure 6:
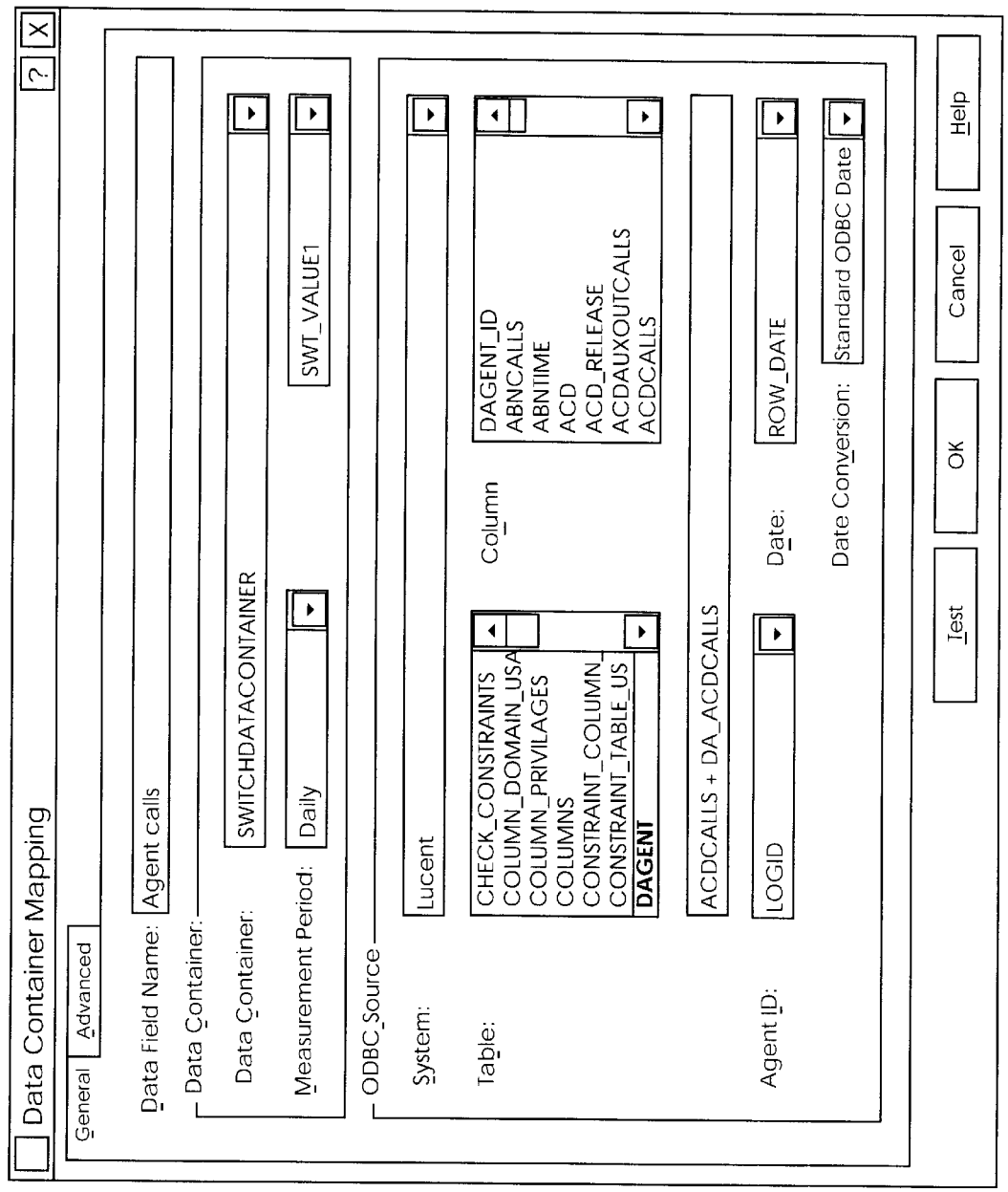

The configuration function then defines the external system data to be extracted in the form of mappings. The mappings are between one or more data sources of the external system and a data container column in the system database 9. Any SQL arithmetic may be applied under user instructions by the configuration function. The sample screen of FIG. 6 illustrates definition of a simple mapping in which data from two columns of the external system is added and the result imported into a data container column of the system 1.

The mappings may perform filtering according to set criteria, in an "advanced" panel, described below.

The integration engine 18 translates each configured mapping into an ODBC SQL statement for extraction system. All mappings are processed together so that the integration engine 18 generates the most efficient SQL statements so that data is extracted with execution of as few SQL statements as possible. This ensures that the import to the system 1 has the minimum impact on performance of the relevant external system.

Figure 7:
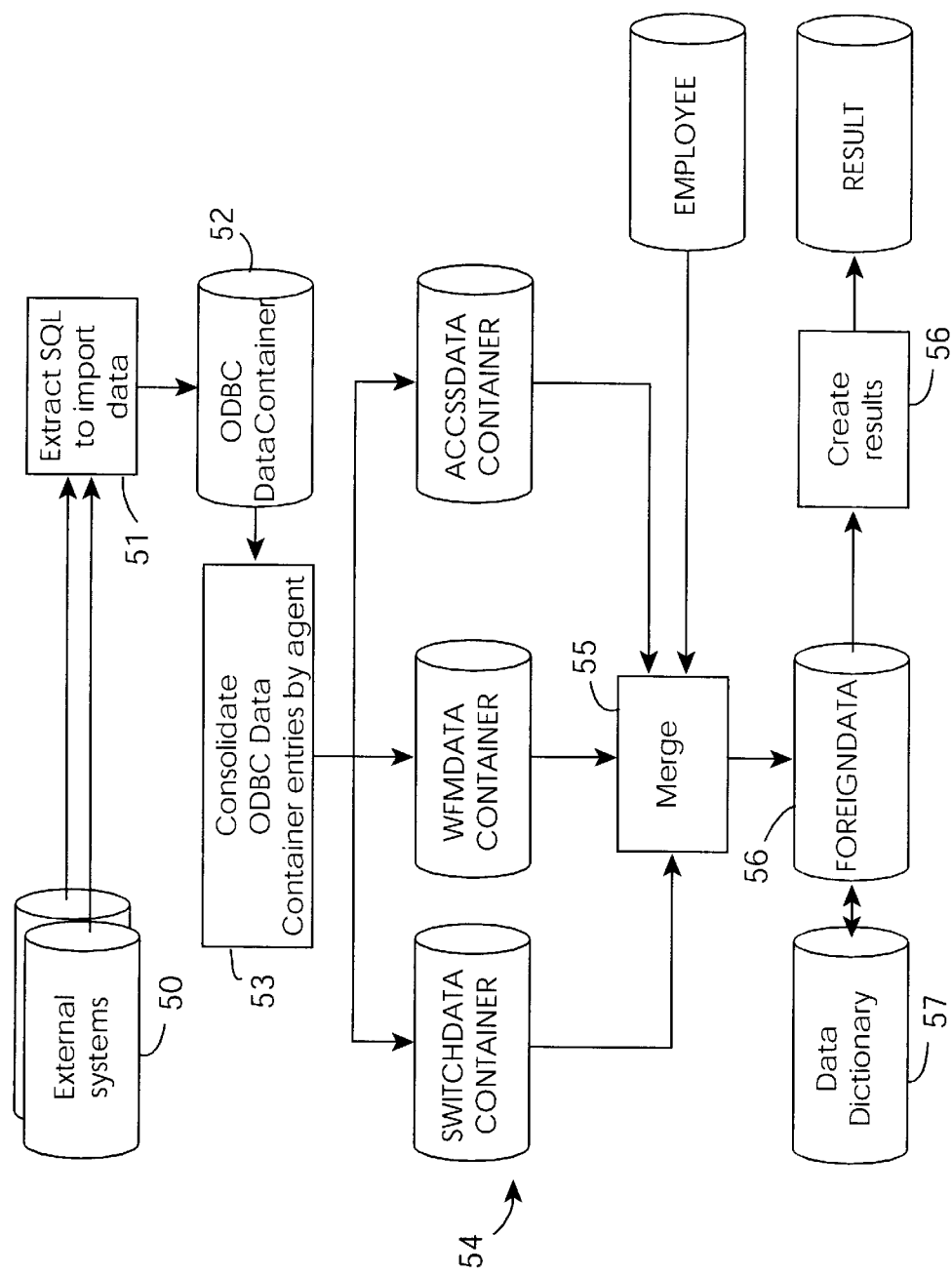
FIG. 7 is a flow diagram illustrating data transfer paths.

Referring now to FIG. 7, the external systems are indicted generally by the numeral 50. In a step 51 the SQL statements are executed to implement the defined mappings and transfer data to an ODBC container 52. The integration engine then in step 53 consolidates the imported data by employee and delivers the consolidated data to separate containers 54. The containers are in this embodiment SWTCHDATA, WFMDATA, and ACCSSDATA one for each external system. The data is consolidated so that for each container each agent has only one row of data attributed to him/her. The consolidated data is delivered to the containers 54 according to a data container column configurator defined in a data container table.

In step 55, the integration engine then merges selected data from these containers into an internal ForeignData Container table 56 consolidated into 1 row (made up of multiple fields) per employee. The merged data is then used for generating results in step 56 according to the data dictionary definitions 57.

In more detail, the following are the field descriptions for the initial stage of configuring the integration engine for integration of a new performance management system with a switch.

| Field Name | Mandatory/ Optional | Field Behaviour | Field Description |
|---|---|---|---|
| System | O | Display | This field displays the name of the external system as configured by the user |
| Data Source | O | Display | If the system is configured by specifying the data source, then the data source is displayed in this field. If this field is populated then the connection string field cannot be populated Field Length: 255 characters |
| Connection String | O | Display | If the system is configured by specifying the connection string, then the connection string is displayed in this field. If this field is populated then the data source field cannot be populated Field Length: 255 characters |

The following are the command options.

| Command Name | Description |
| --- | --- |
| NEW | Launches the External System Configuration sub screen with all fields blank |
| EDIT | Launches the External System Configuration sub screen with all fields pre-populated with the configured data |
| DELETE | Deletes the highlighted entry after prompting the user for confirmation |

Referring again to FIG. 5, this screen allows the user to specify a name for the external data source, and configure the external system by using either the data source or connection string. This screen is launched by activating the 'New' or 'Edit' command button from 'System' tab on the main screen.

In a typical scenario, a call centre needs to interface a performance management system with their workforce management system. Therefore, the external systems configuration screen is launched from the main screen by activating the 'Add' command button. The user specifies the name of the external system as 'Workforce' and then decides how the external system should be configured by either entering the connection string or specifying the data source. The user selects a data source, and enters a username and password. To test that the username and password are correct the user activates the 'Connect' command button, which returns a dialogue box that the connection was successful.

The following are the field descriptions.

| Field Name | Mandatory/ Optional | Field Behaviour | Field Description |
| --- | --- | --- | --- |
| Name | M | Input | Free format alpha numeric text which allows the user to specify a name for the external system Field length: 20 characters |
| Data Source | O | Mutually exclusive radio button Default: enabled | This field, if true, indicates that the external system will be configured by specifying the data source. If this field is enabled/disabled the following fields are enabled/disabled: 1. Data Source 2. User Name 3. Password 4. Additional |
| Data Source | M (if Data Source is selected) | Selection Drop down combo Default: Blank | This field allows the user to specify the data source. The values available for selection are all the data sources available form the 'User DSN' and 'System DSN' tab under ODBC data source administrator in Windows NT This field, once populated by a value, can never be blanked out. Field Length: 255 characters |
| Username | M (if Data Source is selected) | Input | Free format alpha numeric text which allows the user to specify the username for the external system This field can never be blank Field Length: 255 characters |
| Password | M (if Data | Input | Free format alpha numeric text which allows the user to specify the password for the external |

-continued

| Field Name | Mandatory/ Optional | Field Behaviour | Field Description |
| --- | --- | --- | --- |
| | Source is selected) | | system This field can never be blank Field Length: 255 characters |
| Additional | O (if Data Source is selected) | Input | Free format alpha numeric text which allows the user to specify any additional information required to connect to the database for the external system Field Length: 255 characters |
| Connection String | O | Mutually exclusive radio button Default: disabled | This field, if true, indicates that the external system will be configured by specifying the connection string. If this field is enabled/disabled the following fields are enabled/disabled: 1. Connection String |
| Connection String | M (if Connection String is selected) | Input | Free format alpha numeric text which allows the user to specify the connection string for the external system This field, once populated by a value, can never be blanked out. Field Length: 255 characters |

The following are the command options.

| Command Name | Description |
| --- | --- |
| OK | Saves changes and exits the application |
| CANCEL | If changes have been made prompts the user to save, otherwise quits the application |
| HELP | Opens the Help file for the application |

Referring again to FIG. 6, this screen allows the user to map the external systems database columns with columns in the data containers. It also allows the call centre to associate a name with the column in the data container that would populate the DATAFIELDNAME table and hence be displayed to the user in the data dictionary maintenance. The screen also allows the user to specify formulae with the source data fields, so that the Acumen Data Containers can hold calculated data. This function allows this whilst ensuring that the minimum amount of SQL expressions are executed, hence optimising performance.

In a typical scenario, a call centre needs to integrate a performance management system with their switch. Therefore, all the required fields within the switch need to be mapped onto the switch data containers. The implementation consultant would launch the screen of FIG. 6 and enter the name of the data field within the system 1 that the column in the switch would correspond to.

The implementation consultant then selects the data container and column within the data container that the specified external system column is to be mapped to, and the measurement period for the data.

The implementation consultant then specifies the source system as 'Switch' and selects the column within the table that needs to be mapped to the data container. By double clicking a column in the 'Column' list box, that column appears below in the column expression text box. The Consultant may use the 'Column' list box to double click a number of columns—successive columns appear in the column expression text box separated by pluses. For example, double clicking 'CD_CALL_TIME' followed by 'CD_NUM_CALLS' would result in 'CD_CALL_TIME+CD_NUM_CALLS'. The Consultant may then edit this to be 'CD_CALL_TIME/CD_NUM_CALLS'.

The implementation consultant specifies for each table a unique identifier (Agent ID) for each agent. Also, if available, a date column within each table must be specified.

| Field Name | Mandatory/ Optional | Field Behaviour | Field Description |
|---|---|---|---|
| Data Field Name | M | Input | Free format alphanumeric text that allows the user to specify the data field name. This will then be used to identify the name of the foreign value and be displayed to the user in the data dictionary maintenance. Field Length: 18 characters |
| Data Container | M | Selection Drop down combo Default: Blank | The data container that will be mapped to, the possible values that could populate this field are: 1. SWTCHDATACONTAINER 2. WFMDATACONTAINER 3. ACCSSDATACONATINER 4. KPIDATACONTAINER Once specified the field can never be blanked out Field Length: 20 characters |
| Column | M | Selection Drop down combo Default: Blank | The column within the data container that is to be mapped to. This is pre-populated once the 'Data Container' field is populated with a true value and lists all the VALUE fields within the data container Once specified the field can never be blanked out Field Length: 20 characters |
| Measurement Period | M | Selection Drop down combo Default: Blank | Allows the user to select a measurement period for the data. The measurement period specified in the data dictionary that uses this field must be identical. All Measurement periods are available for selection. Once specified the field can never be blanked out Field Length: 20 characters |
| System | M | Selection Drop down combo Default: Blank | The external system that is to be specified as the source for Acumen. The systems available for selection are those configured in the 'External System Configuration' utility Once specified the field can never be blanked out Field Length: 20 characters |
| Table | M | Display | Displays all the tables available in the table specified in the 'System' field. If a different system is selected in the 'System' field, this is refreshed to show the tables in the newly highlighted system. Field Length: 255 characters |
| Column chooser | O | Display | Displays all the columns available in the table specified in the 'Table' field. If a different table is highlighted in the 'Table' field then this field is refreshed to show the columns in the newly highlighted table. Field Length: 255 characters |

-continued

| Field Name | Mandatory/ Optional | Field Behaviour | Field Description |
|---|---|---|---|
| Column expression | M | Display | Displays the column SQL expression used to derive the data to be inserted into the data container column. This may be a single column from the table or some SQL expression based on 0 or more columns from the table. Field Length: 500 characters |
| Agent ID | M | Selection Drop down combo Default: Blank | This field allows the user to select the column within the table that uniquely identifies the agent. The drop-down in this field displays all the columns available in the table specified in the 'Table' field Once specified the field can never be blanked out Field Length: 20 characters |
| Date | O | Selection Drop down combo Default: Blank | Allows the user to select the column within the table that uniquely identifies the date. The drop-down in this field displays all the columns available in the table specified in the 'Table' field By selecting a column from this combo, the data selected from the table will be filtered to only select rows where this date matches the date(s) for the overnight. For example, if the mapping has a Daily measurement period, only rows where the date column matches the system date will be selected. This field can be blanked out at any time Field Length: 20 characters |
| Date Conversion | O | Selection Drop down combo Default: Blank | Where a Date column has been selected, this allows the consultant to select a date conversion stored procedure that needs to be applied in order to translate the system 1 date format (YYYYMMDD) to that format used within the external database. For example, a switch represents date using a numeric column where the date is in YYYMMDD format. The year 1999 in YYY format is 099, 2000 is 100 and 2001 is 101. In this case, a 'Date Conv' option would be available from this combo and when selected will cause a custom stored procedure within the database 9 to be invoked during data extraction, to change the system 1 date to the external system format. |

The following are the command options.

| Command Name | Description |
|---|---|
| TEST | Executes the SQL expression to ensure that a single numerical value is returned. Displays a dialogue box informing the user of either success or failure of the test. |
| OK | Saves changes and exits the application |

-continued

| Command Name | Description |
|---|---|
| CANCEL | If changes have been made prompts the user to save, otherwise quits the application |
| HELP | Opens the Help file for the application |

Figure 8:
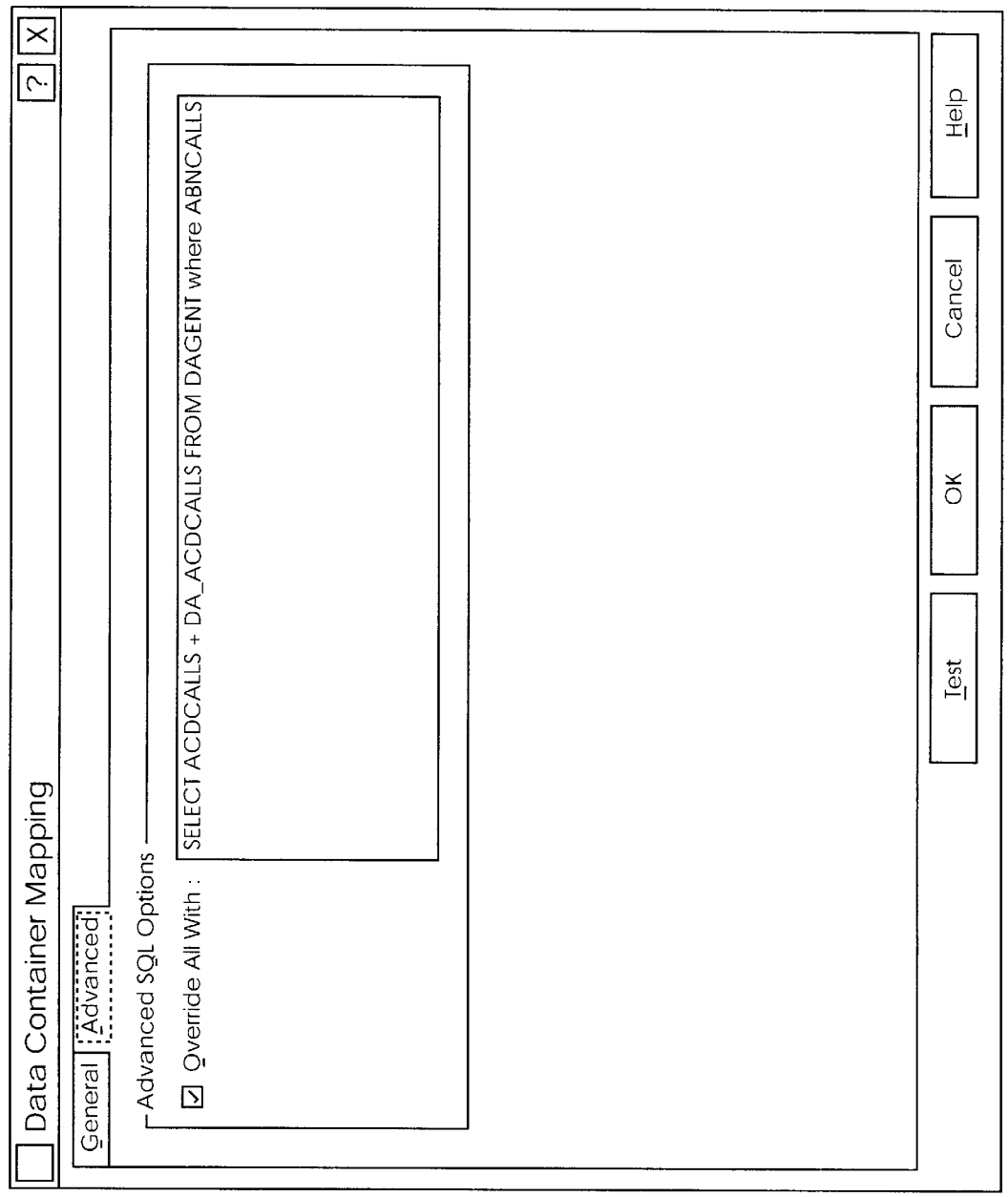
FIGS. 8, 9, and 10 are sample screens illustrating operation of the integration engine.

As stated above, the integration engine 18 provides for advanced mapping with complex filtering of source data. Referring to FIG. 8 a data container mapping screen is used when the 'Column Expression' functionality of the 'General' tab is insufficient to map the required data. Having configured all fields of the mapping on the general tab rather than using the Column Chooser Combo and Column Expression Text Box, the consultant uses the Advanced tab to define the data to be retrieved.

The consultant enters an SQL 'select' statement that returns one 'column' of data—although that may be derived from a number of columns from one or more tables on the system. The consultant may also filter data to be returned by use of an SQL 'where' clause in the 'select' expression. In addition to entering valid SQL, the consultant may include parameters in the SQL text. Parameters are used to substitute variable values into the SQL expression. The parameter values may be changed as often as required and are substituted into the SQL expression just before it is executed during the overnight processing. Parameters are described in more detail below.

In a typical scenario, the call centre may want to measure agents based on a 'compliance' form of data, for example, that the agent has not had more than three short calls. The consultant creates a new data field named 'Short Call Compliance' and chooses the data container, its column and measurement period. The system and table are chosen and then the Agent Id and Date columns are selected.

The consultant wants to return a '1' where the number of short calls are less than or equal to three. The 'Advanced' tab is chosen and the consultant enters 'select 1 from DAGENT where SHORT_CALLS<=3'.

Alternatively, the consultant may use a parameter instead of the constant '3'—e.g. 'select 1 from DAGENT where SHORT_CALLS<=:MAX_SHT_CALLS'

The following describes the fields.

| Field Name | Mandatory/ Optional | Field Behaviour | Field Description |
|---|---|---|---|
| Override All With | M | Check box Default: false | Allows the consultant to select whether the 'Column Expression' text box on the 'General' tab is overridden by the contents of the SQL edit text on this Advanced tab. |
| SQL edit text | O | Display/ Input | If the 'Override All With' check box is checked, this displays the SQL expression used to extract the data for the data container column. |

The following are the command options.

| Command Name | Description |
|---|---|
| TEST | Executes the SQL expression to ensure that a single numerical value is returned. Displays a dialogue box informing the user of either success or failure of the test. |
| OK | Saves changes and exits the application |
| CANCEL | If changes have been made prompts the user to save, otherwise quits the application |
| HELP | Opens the Help file for the application |

Figure 9:
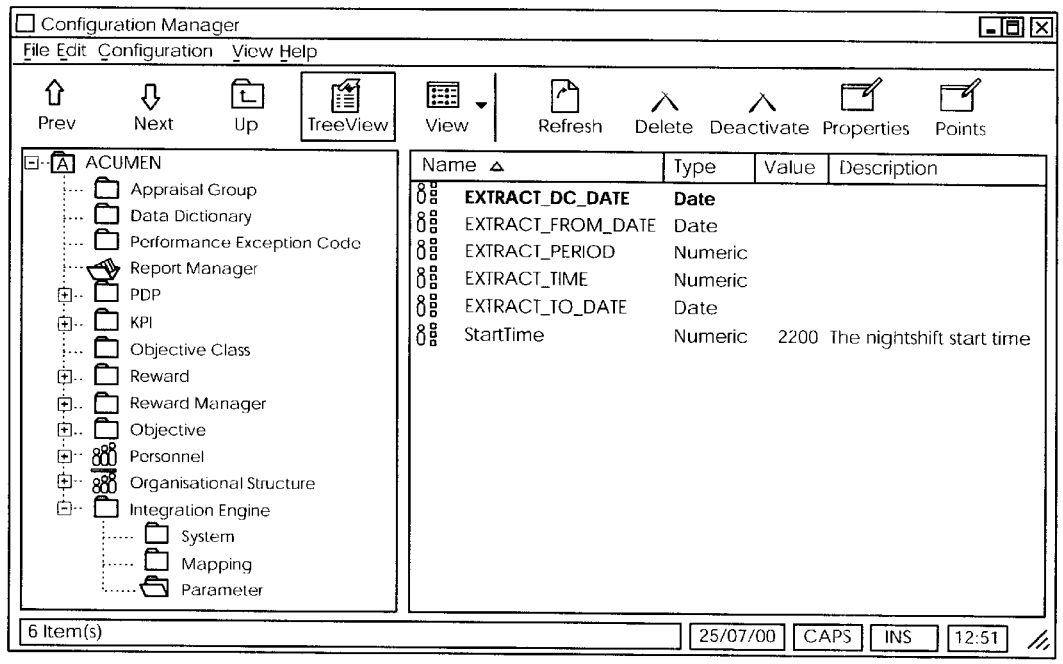

Referring to FIG. 9 a secondary screen for parameters is shown. Parameters may be used in the SQL entered by a consultant on the Advanced tab of the Data Container Mapping screen. The screen allows the user to view all the parameters configured within the system. The screen primary function is to maintain these data fields by allowing users to add, edit or delete data fields.

There are several 'System' parameters such as ':EXTRACT_FROM_DATE' and ':EXTRACT_TO_DATE' that may not be edited or deleted from the system.

In a typical scenario, a call centre wants to combine agent data between two days where an agent is working a nightshift. In this case, the Advanced SQL option is used and the consultant wants to filter data where the STARTTIME column is greater than or equal to the nightshift start time. Rather than including the current nightshift start time (2200) into the SQL expressions, a parameter named ':ShiftStart' is created with a value of 2200. The ':ShiftStart' parameter name is used in the SQL expressions. Later, the nightshift start time is changed to 2230—the consultant only needs to change the parameter value.

The following are the field descriptions.

| Field Name | Mandatory/ Optional | Field Behaviour | Field Description |
|---|---|---|---|
| Name | O | Display | The parameter name - this must start with a colon, be two or more characters long up to a maximum of twenty characters and other than the colon, contain only alphanumeric or underscore characters. |
| Type | O | Display | The parameter value type - either numeric, string or date. |
| Value | O | Display | The current value for the parameter. This is what will be substituted for the parameter's name in the SQL statement. |
| Description | O | Display | A description of the purpose of the parameter. |

The following are the command options.

| Command Name | Description |
|---|---|
| NEW | Launches the Parameter sub screen with all fields blank |
| EDIT | Launches the Parameter sub screen with all fields pre-populated with the configured data. 'System' parameters such as ':EXTRACT_FROM_DATE' may not be edited. |

-continued

| Command Name | Description |
| --- | --- |
| DELETE | Deletes the highlighted entry after prompting the user for confirmation and checking that the parameter is not already in use in a mapping's advanced SQL. 'System' parameters such as ':EXTRACT_FROM_DATE' may not be deleted. |

Figure 10:
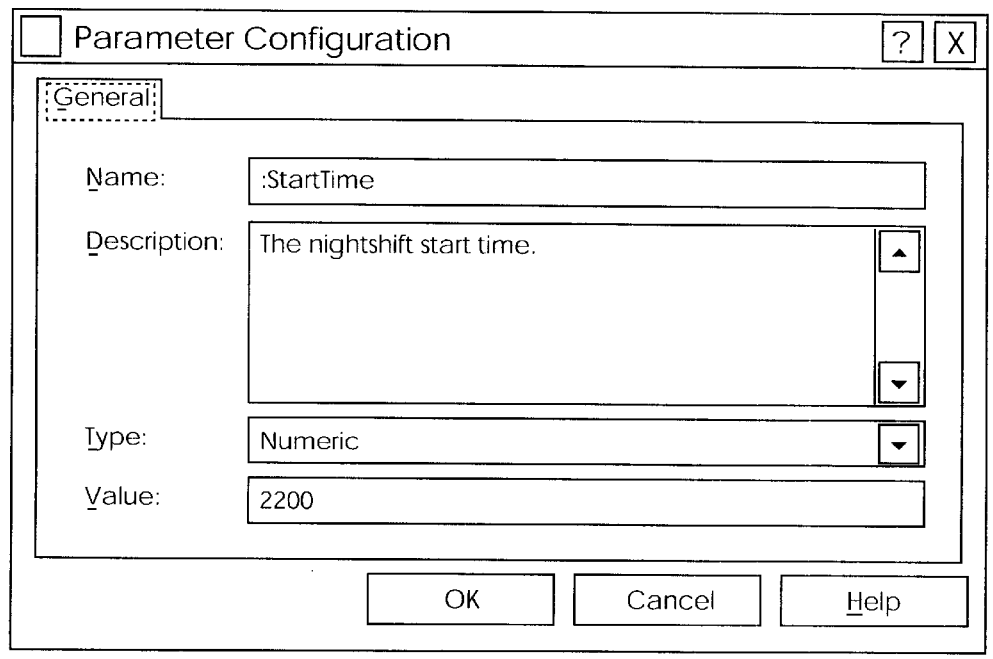

Referring to FIG. 10 a sub-screen for specifying parameter properties is illustrated. This screen enables the user to alter the Name, Description, Type and Value of existing Parameters and to enter these details for new Parameters. It is launched by activating the 'New' or 'Edit' buttons of the Parameter browser.

As an example, a consultant requires a parameter to be used in a Data Container Mapping's Advanced SQL statement. The 'New' button is activated on the parameter browser to display this screen. The user enters the parameter name starting with a colon, provides a description of the purpose of the parameter, selects the Numeric type and enters a numeric initial value for the parameter.

The following are the field descriptions.

| Field Name | Mandatory/ Optional | Field Behaviour | Field Description |
| --- | --- | --- | --- |
| Name | M | Input | Parameter name starting with a colon, at least two characters long, with other characters being alphanumeric or underscore. Field Length: 20 characters |
| Description | O | Input | Free format alpha numeric text allowing the user describe the purpose of the parameter. Field Length: 255 characters |
| Type | M | Selection Drop down combo Default: Blank | Allows the user to define whether the parameter is used to represent numeric, date or free format text values. Once specified the field can never be blanked out Field Length: 20 characters |
| Value | M | Input | The current value for the parameter. Field Length: 200 characters |

The following are the command options.

| Command Name | Description |
| --- | --- |
| OK | Saves changes and exits the application |
| CANCEL | If changes have been made prompts the user to save, otherwise quits the application |
| HELP | Opens the Help file for the application |

It will be appreciated that the invention provides for comprehensive integration of a system such as a performance management system with an external system. The integration engine 18 allows automatic and comprehensive transfer of data so that the systems are comprehensively integrated. This is important for optimum operation of the host system so that the fields are fully populated both with raw data and filtered or processed data. The integration engine 18 operates particularly well with the data dictionary of the host system.

The invention is not limited to the embodiments described but may be varied in construction and detail.

What is claimed is:

1. An integration engine for transfer of source data from a data processing external system to a data processing host system, the integration engine comprising:
   a configuration function comprising means for defining the external system data to be exported, mappings to be applied to the exported data, and target locations in the host system for imported data, and
   an execution function comprising means for translating the mappings into executable program code, and for executing the code to import data into the host system.

2. A host system comprising:
   an integration engine as claimed in claim 1, information management functions for processing the imported data.

3. A host system as claimed in claim 2, wherein the host system is a performance management system further comprising:
   a call centre configuration function for configuring call centre parameters in a configuration dataset, and
   a data dictionary function for formulating under user instructions, calculation rules, value inputs for rules, and storage parameters for database fields.

4. A performance management system as claimed in claim 3, wherein the user interface, the configuration functions, and the performance management functions together have a structure of classes for instantiating objects in a user interface layer, a business logic layer, and a data services layer.

5. A performance management system as claimed in claim 4, wherein the business logic class instantiates business logic objects having code of a configuration or an information function, and means for terminating the object at the end of a user session.

6. A performance management system as claimed in claim 5, wherein the business logic layer executes on a business server.

7. A performance management system as claimed in claim 6, wherein the data services layer comprises a class for instantiating data services objects residing on a database server and means for terminating said objects after a user session.

8. A performance management system as claimed in claim 4, wherein the system comprises a transaction server for executing data services layer functions.

9. A performance management system as claimed in claim 8, wherein the transaction server comprises means for maintaining a pool of data services objects together and for maintaining a pool of database connections.

10. A performance management system as claimed in claim 4, wherein dynamic library links for the objects are registered using proxy stub pairs on both a client and a server.

11. A performance management system as claimed in claim 3, wherein:
    the integration engine comprises means for writing imported data to a foreign data table after execution of mappings and selection of particular fields, and in which the data is consolidated into one dataset per agent, and
    the information management functions comprises means for generating performance management results according to data definitions generated by the data dictionary function.

12. An integration engine as claimed in claim 1, wherein the execution function comprises means for consolidating the imported data according to persons for whom there are records in the host system.

13. An integration engine as claimed in claim 12, wherein the execution function comprises means for writing the consolidated data to a plurality of data containers of which there is at least one per external system.

14. An integration engine as claimed in claim 13, wherein data associated with each person is written to a single dataset in each container.

15. An integration engine as claimed in claim 14, wherein the execution function comprises means for merging selected data from said containers into a single foreign data container comprising a single dataset per person.

16. An integration engine as claimed in claim 15, wherein the execution function comprises means for generating interfacing with an information management function of the host system to generate output results.

17. An integration engine as claimed in claim 1, wherein the configuration function comprises means for defining filtering of the source data.

18. An integration engine as claimed in claim 17, wherein the configuration function comprises means for storing mapping operator statement for mapping of data from an external system to a data container.

19. An integration engine as claimed in claim 18, wherein the configuration function comprises means for associating the statements 11 with parameter fields, having variable values.

20. An integration engine as claimed in claim 1, wherein the configuration function comprises means for generating an external system dataset, mappings dataset, and a parameter value dataset.

21. An integration engine as claimed in claim 1, wherein the configuration function comprises means for definition of target locations in the host system as data container columns.

22. An integration engine as claimed in claim 1, wherein the configuration function comprises means for defining mathematical function mappings in which source data from a plurality of locations in the external system is processed.

23. An integration engine as claimed in claim 1, wherein the host system is a performance management system and the external system is a customer services system.

* * * * *